United States Patent
Zavadsky

(10) Patent No.: US 7,668,153 B2
(45) Date of Patent: Feb. 23, 2010

(54) METHOD FOR DATA CONVERTER SAMPLE CLOCK DISTRIBUTION

(75) Inventor: Dean Zavadsky, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 334 days.

(21) Appl. No.: 11/774,441

(22) Filed: Jul. 6, 2007

(65) Prior Publication Data

US 2008/0240164 A1 Oct. 2, 2008

Related U.S. Application Data

(60) Provisional application No. 60/908,348, filed on Mar. 27, 2007.

(51) Int. Cl.
*H04J 3/08* (2006.01)

(52) U.S. Cl. ............ 370/350; 370/503; 370/506; 709/208; 713/400; 713/500

(58) Field of Classification Search .............. None
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmiiller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Chien-Yeh Lee | |
| 5,243,598 A | 9/1993 | Lee | |
| 5,321,849 A | 6/1994 | Lemson | |
| 5,339,184 A | 8/1994 | Tang | |
| 6,259,281 B1* | 7/2001 | Neff | 327/91 |
| 2003/0020644 A1* | 1/2003 | Yeap et al. | 341/144 |
| 2006/0006918 A1* | 1/2006 | Saint-Laurent | 327/295 |
| 2007/0153952 A1* | 7/2007 | Herrin et al. | 375/376 |

FOREIGN PATENT DOCUMENTS

| | | |
|---|---|---|
| EP | 0391597 | 10/1990 |
| WO | 9115927 | 10/1991 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications",Jun. 1991 , pp. 1171-1175, Publisher: IEEE.

* cited by examiner

*Primary Examiner*—Chi H. Pham
*Assistant Examiner*—Shick Hom
(74) *Attorney, Agent, or Firm*—Fogg & Powers LLC

(57) ABSTRACT

A unit for use in a communication system comprises a communication module having an oscillator configured to generate a master clock signal; a plurality of conversion modules; and a distribution component configured to distribute the master clock signal from the communication module to each of the plurality of conversion modules. Each of the plurality of conversion modules comprises a filter configured to filter the master clock signal; and a converter configured to use the filtered master clock signal in converting between analog and digital signals.

30 Claims, 6 Drawing Sheets

METHOD FOR DATA CONVERTER SAMPLE CLOCK DISTRIBUTION

RELATED APPLICATIONS

This application is related to the following commonly assigned co-pending applications, each of which is hereby incorporated herein by reference:

U.S. patent application Ser. No. 11/627,255 (currently pending), entitled "A DISTRIBUTED REMOTE BASE STATION SYSTEM" (the '829 Application).

U.S. patent application Ser. No. 11/627,251 (currently pending), entitled "MODULAR WIRELESS COMMUNICATIONS PLATFORM" (the '828 Application).

U.S. Provisional Patent Application Ser. No. 60/908,348, filed Mar. 27, 2007 entitled ", A METHOD FOR DATA CONVERTER SAMPLE CLOCK DISTRIBUTION," hereby incorporated herein by reference. The present application hereby claims priority, under 35 U.S.C. §119(e), to U.S. Provisional Patent Application No. 60/908,348.

BACKGROUND

Digital sampling requires a sample clock with low jitter since the more jitter in the sample clock, the more inaccurate the timing of the sampling event. Inaccurate timing of the sampling event translates into greater noise in the sampled signal. This is particularly evident in wideband digital sampling and can be expressed by the equation:

$$SNR = 20*\log(2*\pi*F_{in}*T_j)$$

where $F_{in}$ is the sampled frequency and $T_j$ is the sampling clock jitter For example, in order to obtain 75 dB SNR for a $F_{in}$ of 70 MHz, the equation above requires a sample clock with less than 400 fs of RMS jitter.

In order to achieve this jitter performance, a sampling clock would generally need an amplitude-to noise floor ratio of −165 dbc/hz or less. This is due to the wide input bandwidth of the data converter's clock input being exposed to the noise floor power several hundred MHz away from the clock frequency. Furthermore, the noise floor of a sample clock signal can fold into the sample bandwidth of a data converter at every multiple of the Nyquist frequency. This folding essentially introduces copies of the noise into the sampled signal which further degrades the signal-to-noise ratio of the sampled signal. A clock with this low noise floor performance is relatively expensive compared to other off-the-shelf clock sources. This relatively high cost and complexity is increased even for a system requiring several synchronous data converters.

For the reasons stated above, and for other reasons stated below which will become apparent to one of ordinary skill in the art upon reading and understanding the present specification, there is a need in the art for a system and method of distributing a sample clock which provides the needed accuracy without relatively high cost and complexity.

SUMMARY

The above mentioned problems and other problems are resolved by the present invention and will be understood by reading and studying the following specification.

In one embodiment, a unit for use in a communication system is provided. The unit comprises a communication module having an oscillator configured to generate a master clock signal; a plurality of conversion modules; and a distribution component configured to distribute the master clock signal from the communication module to each of the plurality of conversion modules. Each of the plurality of conversion modules comprises a filter configured to filter the master clock signal; and a converter configured to use the filtered master clock signal in converting between analog and digital signals.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Like reference characters denote like elements throughout the Figures and text.

DETAILED DESCRIPTION

In the following detailed description, reference is made to the accompanying drawings that form a part hereof, and in which is shown by way of illustration specific illustrative embodiments in which the device may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

The present apparatus is a modular wireless platform that enables a system facilitator to easily and inexpensively adapt their wireless system for use with different data transport mechanisms, frequency bands, communication technologies, and intelligence distribution. This modular platform is made up of a reconfigurable host unit and a reconfigurable remote unit designed for use in a system with a central node and a plurality of distributed antennas. The host unit is located near the central node and facilitates transmission/reception of information to/from the remote units which are located remotely with an accompanying antenna. The remote units function to transmit/receive transmissions from the host unit and transmit/receive wireless signals over accompanying antenna to mobile costumers.

Host unit and remote unit have a modular design and defined interfaces that allow components to be removed and installed to adapt to the needs of the service providers. Both host and remote unit are designed around a serial communication module and have a defined interface where different varieties of conversion modules can be connected and disconnected. There are many different conversion modules, and each conversion module is designed for a particular technology and frequency band. Thus, technology and frequency band adjustments can be made by simply replacing the conversion module in the host unit or remote unit. Additionally, host unit and remote unit are designed to allow different transport mechanisms between the host unit and remote unit. For example, the same host unit and remote unit that use fiber optic for inter-unit transmission can be adapted to use E Band wireless transmission instead of or concurrently with the fiber optic. Finally, wireless processing functionality can be placed all on a base station near the central node, or the functionality can be distributed throughout each of the remote units. The flexibility to modify the functionality of each remote unit allows the wireless platform to support centralized base stations and distributed base stations, either separately or concurrently.

Figure 1:
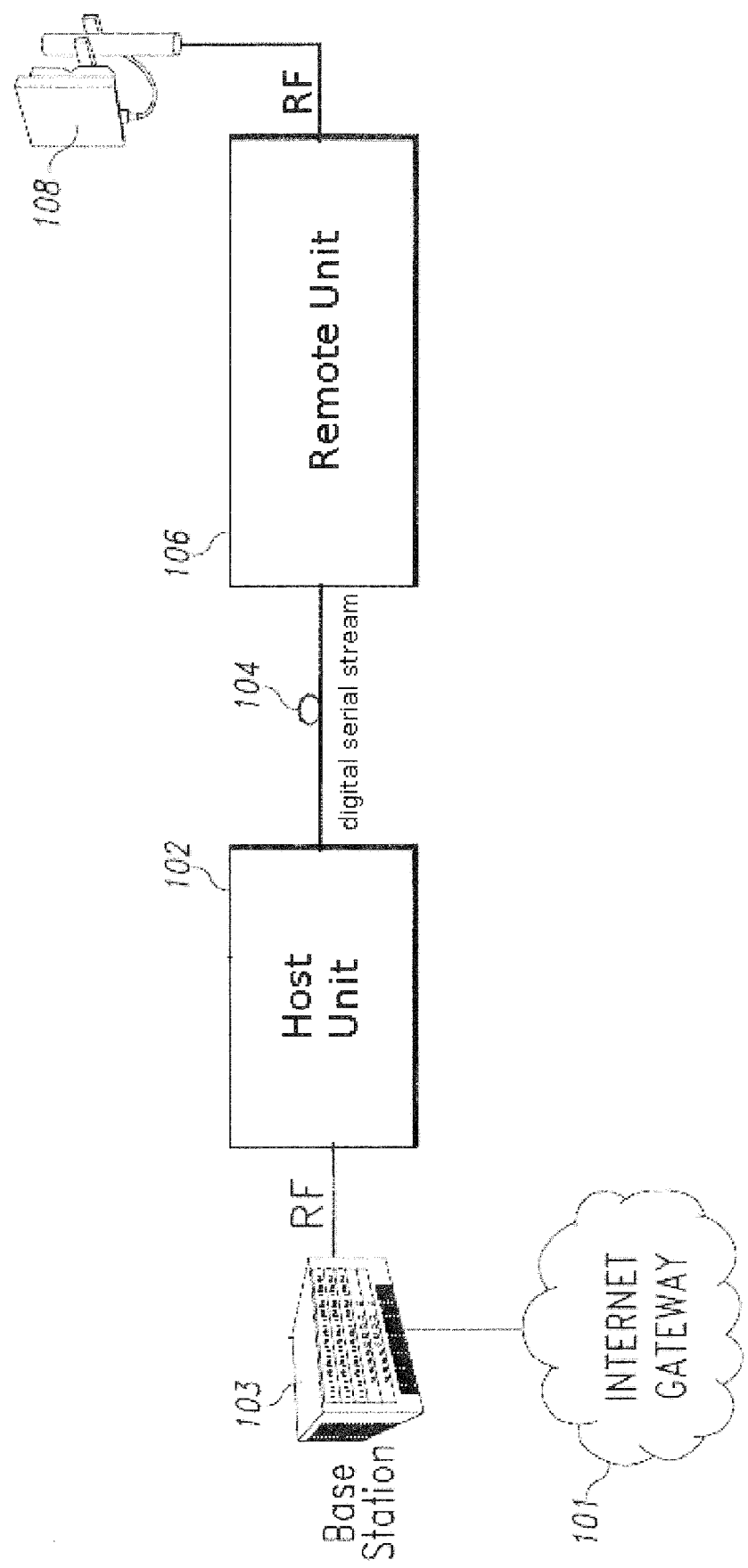
FIG. 1 is an illustration of one embodiment of a system using a modular wireless communications platform.

FIG. 1 is a block diagram of one embodiment of a system 100 using a modular wireless communications platform. System 100 is a field configurable distributed antenna system (DAS) that provides bidirectional transport of a fixed portion of RF spectrum from an Internet Protocol (IP) gateway 101 to a remote antenna 108. Along with IP gateway 101 and remote antenna 108, system 100 includes a base station 103, a host unit 102, a transport mechanism 104, and a remote unit 106. Host unit 102, a modular host transceiver, and remote unit 106, a modular remote radio head, work together to transmit and receive data to/from remote antennas. In this embodiment, host unit 102 provides the interface between base station 103 and signal transport mechanism 104. Remote unit 106 provides the interface between transport mechanism 104 and remote antenna 108. In this embodiment, signal transport mechanism 104 is an optical fiber, and host unit 102 sends optical signals through the optical fiber to remote unit 106.

During transmission, base station 103 performs baseband processing on IP data from IP gateway 101 and places the IP data onto a channel. In one embodiment, base station 103 is an IEEE 802.16 compliant base station. Optionally, base station 103 may also meet the requirements of WiMax, WiBro, or a similar consortium. In another embodiment, base station 103 is an 800 MHz or 1900 MHz base station. In yet another embodiment, the system is a cellular/PCS system and base station 103 communicates with a base station controller. In still another embodiment, base station 103 communicates with a voice/PSTN gateway. Base station 103 also creates the protocol and modulation type for the channel. Base station 103 then converts the IP packetized data into an analog RF signal for transmission over antenna 108. Base station 103 sends the RF signal to host unit 102. Host unit 102 converts the analog RF signal to a digital serial data stream for long distance high speed transmission over transport mechanism 104. Host unit 102 sends the serial data stream over transport mechanism 104, and the stream is received by remote unit 106. Remote unit 106 converts the received serial data stream back into the original analog RF signal and transmits the signal over antenna 108 to consumer mobile devices.

Figure 2:
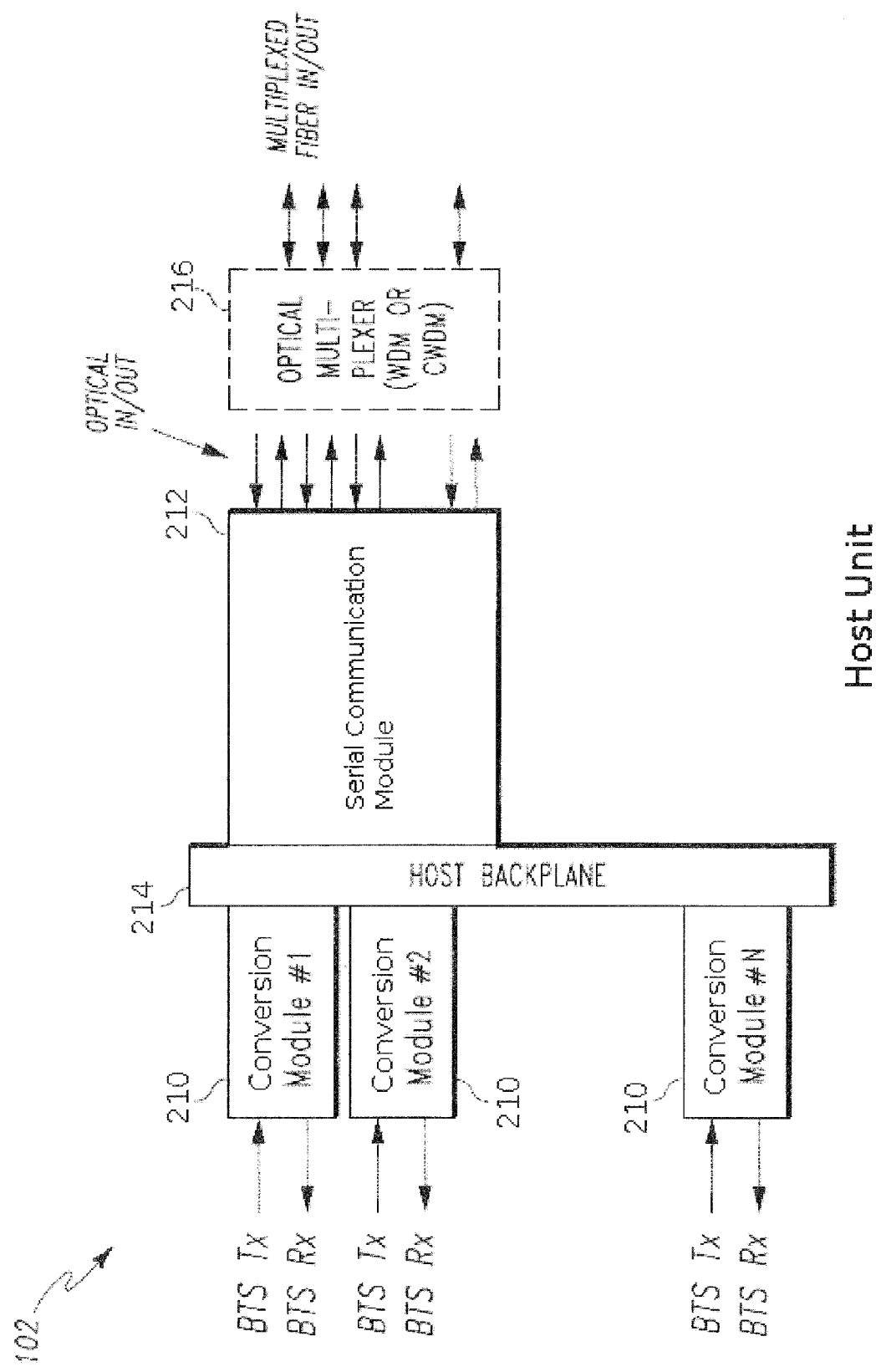
FIG. 2 illustrates a schematic view of one embodiment of a host unit for use in the system of FIG. 1.

FIG. 2 illustrates a schematic diagram of one embodiment of a host unit 102 for use in a modular wireless communications platform. Host unit 102 has a serial communication module 212 that is coupled to an interface 214. Interface 214 has a plurality of connectors each of which is configured to receive a pluggable conversion module 210. The connectors of interface 214 are configured to connect conversion module 210 to serial communication module 212. Interface 214 is a common interface that is configured to allow communication between a single serial communication module 212 and different varieties of conversion modules 210. Additionally, interface 214 allows multiple conversion modules 210 to connect to a single serial communication module 212. In this embodiment, interface 214 is a passive host backplane to which serial communication module 212 also connects. In this embodiment, interface 214 has eight connectors, one for each of eight conversion modules 210. In another embodiment, instead of being a host backplane, interface 214 is integrated with serial communication module 212.

Conversion modules 210 provide bi-directional conversion to/from analog RF signals from/to digital sampled RF signal (also referred to herein as a digital signal). In one direction of communication, conversion module 210 receives an incoming analog RF signal from base station 103 and converts the analog signal to a digital signal for use by serial communication module 212. In the other direction conversion modules 210 receive digital sampled RF data from serial communication module 212 and convert the data to analog RF for use by base station 103.

Each conversion module 210 has a common communication interface for communication with serial communication module 212, and an RF processing portion that is exclusive to one frequency band and communication technology. Each conversion module 210, therefore, converts to/from one analog RF to the digital signal used by serial communication module 212. For example, conversion module 210 is designed to transmit 850 MHz cellular transmissions. As another example, conversion module 210 transmits 1900 MHz PCS signals. Some of the other options for conversion modules 210 include Nextel 800 band, Nextel 900 band, PCS full band, PCS half band, BRS, WiMax, and the European GSM 900, DCS 1800, and UMTS 2100. By allowing different varieties of conversion modules 210 to be plugged into interface 214, host unit 102 is configurable to any of the above frequency bands and technologies as well as any new technologies or frequency bands that are developed. Host unit 102, once installed, is field configurable to transmit a variety desired by insertion of a different conversion module. Additionally, since serial communication module 212 is configured to communicate with multiple different conversion modules 210, a single host unit 102 can transmit/receive multiple frequency bands or technologies.

Serial communication module 212 provides bi-directional conversion to/from a digital signal from/to a high speed optical serial data stream. In one direction, serial communication module 212 receives incoming digital signals from Conversion modules 210 and sends a serial optical data stream over transport mechanism 104 to remote unit 106. In the other direction, serial communication module 212 receives an optical serial data stream from a remote unit 106 and provides digital signals to Conversion modules 210. In one embodiment, the digital signals between conversion module 210 and serial communication module 212 are a parallel data stream. In another embodiment, the digital signals are a serial data stream.

Serial communication module 212 also allows multiple conversion modules 210 to operate in parallel. Serial communication module 212 actively multiplexes the signals from each conversion module 210 such that they are sent simultaneously over a single transport mechanism 104. To accomplish this, serial communication module 212 presents a clock signal to each conversion module 210 to ensure synchronization.

In one embodiment, an optical multiplex module 216 is optically coupled to serial communication module 212. Optical multiplex module 216 performs multiplexing/de-multiplexing of an optical serial data stream to/from serial communication module 212 over transport mechanism 104. In this embodiment, optical multiplex module 216 performs wavelength division multiplexing.

In another embodiment, transport mechanism 104 is a wireless millimeter wave signal transceiver (e.g. E Band/70 GHz radio). In this embodiment, host unit 102 sends optical signals to a millimeter wave transceiver which converts the optical signals into millimeter waves and transmits the millimeter waves to a similar millimeter wave transceiver connected to remote unit 106. In yet another embodiment, transport mechanism 104 is a microwave radio transceiver. In still another embodiment, transport mechanism 104 is a T1 connection for transmission of IP data.

Figure 3:
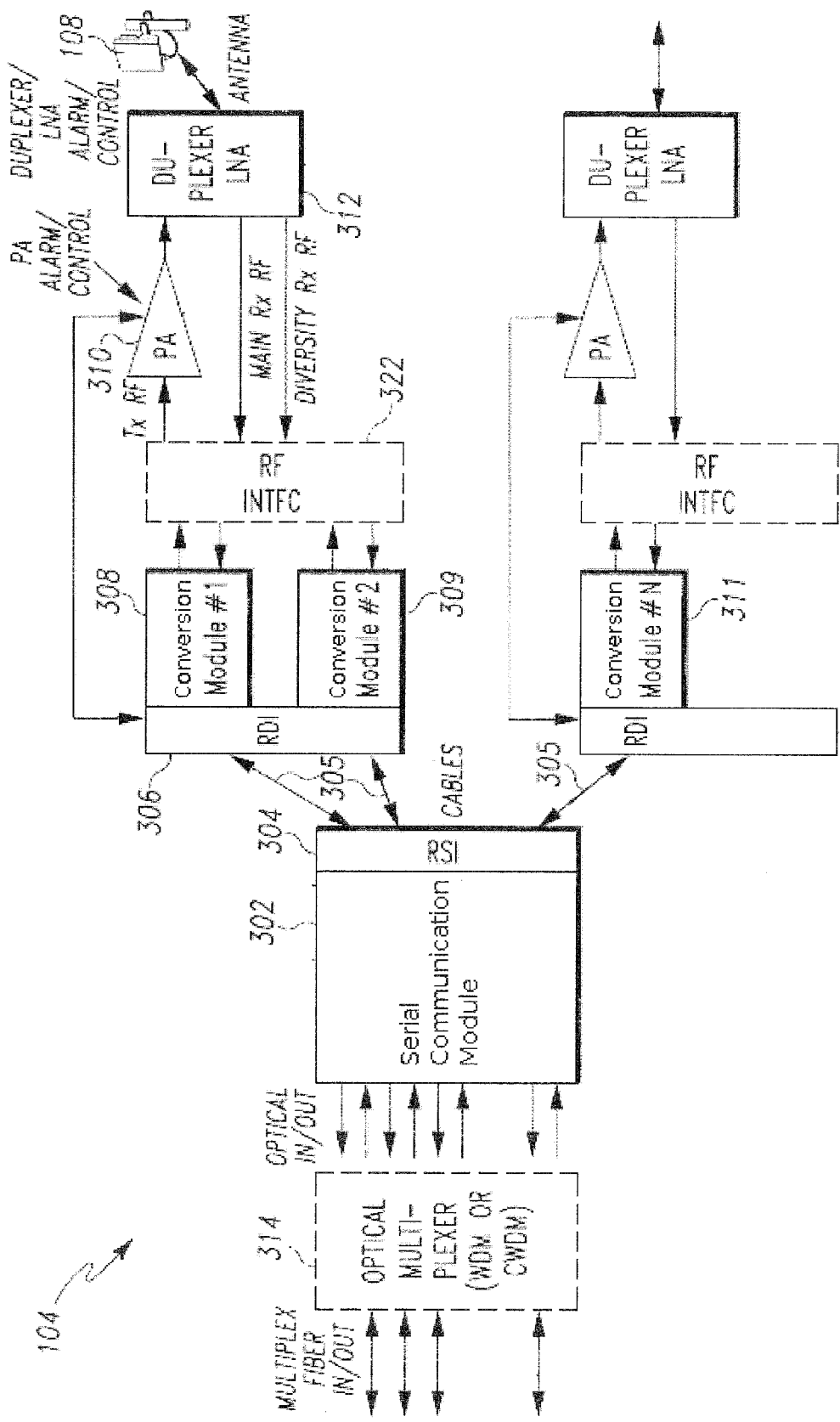
FIG. 3 illustrates a schematic view of one embodiment of a remote unit for use in the system of FIG. 1.

FIG. 3 is a schematic diagram of one embodiment of a remote unit 106 for use in a modular wireless communications platform. Remote unit 106 has a serial communication module 302, an interface 304, at least one interface 306. In this embodiment, Conversion modules 308, 309, 311, power amplifier 310, duplexer/linear amplifier 312, and optical multiplex module 314 are all installed in remote unit 106 which is connected to antenna 108.

Serial communication module 302 is designed and performs similar to serial communication module 212 of host unit 102. Likewise, conversion modules 308, 309, 311 have the same features and design options as conversion modules 210 of host unit 102. There is a slight difference from host unit 102, however, in the manner in which serial communication module 302 and conversion modules 308, 309, 311 are connected. In this embodiment of remote unit 106, serial communication module 302 has an interface 304 which is used to link serial communication module 302 to cables 305. Cables 305 are used to allow conversion modules 308, 309, 311 to be physically spaced from serial communication module 302 and from other conversion modules. Cables 305 connect to interface 306. conversion modules 308 are connected to interface 306 and communicate with serial communication module 302 through interface 306 over cables 305 and through interface 304. In another embodiment, interface 304, and cables 305 are eliminated and interface 306 is integrated into serial communication module 302.

Conversion modules 308 perform similar to conversion module 210, except the ultimate destination/origination of the signals to/from conversion modules 308 is antenna 108 and not base station 103 as in host unit 102. Optical multiplex module 314 also performs similarly to optical multiplex module 216 of host unit 102.

Serial communication module 302 receives the serial data stream from host unit 102 and converts the serial data stream to a digital sampled RF signal. Conversion module 308 then converts the digital sampled RF signal to an analog RF signal. Once a signal is converted to analog RF by conversion module 308, the analog RF signal is sent through RF interface 322 (explained below) to power amplifier 310. Power amplifier 310 amplifies the analog RF signal received from conversion module 308 for output through duplexer/linear amplifier 312 to antenna 108. Similar to conversion modules 308, 309, 311, power amplifier 310 is designed for a certain frequency band and technology. Power amplifier 310 is, therefore, removable and is plugged into a power amplifier connector on remote unit 106 which is configured to receive power amplifier 310. The power amplifier connector is configured to couple power amplifier 310 to duplexer/linear amplifier 312 and to conversion module 308. Power amplifier 310 also has an alarm and control line that is connected to interface 306 for communication to serial communication module 302.

Once the analog RF signal is amplified by power amplifier 310, duplexer/linear amplifier 312 provides duplexing of the analog RF signal which is necessary to connect transmit and receive RF signals to a common antenna. Duplexer/linear amplifier 312 also provides low noise amplification of received RF signals and rms power detection of incident and reflected RF power in RF transmission signals. Similar to conversion modules 308, 309, 311 and power amplifier 310, duplexer/linear amplifier 312 is frequency band and technology specific, and is removable. Duplexer/linear amplifier 312 plugs into a connector in remote unit 106 configured to receive duplexer/linear amplifier 312. Furthermore, the connector is configured to couple duplexer/linear amplifier 312 to power amplifier 310 and to antenna 108. Duplexer/linear amplifier 312 also has a control and alarm line that is connected to interface 322 for communication to serial communication module 302. In this embodiment, the frequency band and technology allow use of a single power amplifier 310 and duplexer/linear amplifier 318 by both conversion module 308 and conversion module 309. In this embodiment, an RF interface 322 is placed between power amplifier 310, duplexer/linear amplifier 312 and conversion modules 308, 309. RF interface 322 provides RF splitting/combining of the RF transmit and receive signals necessary to allow connection of two conversion modules 308, 309 to a single power amplifier 310 and duplexer/linear amplifier 312.

Figure 4:
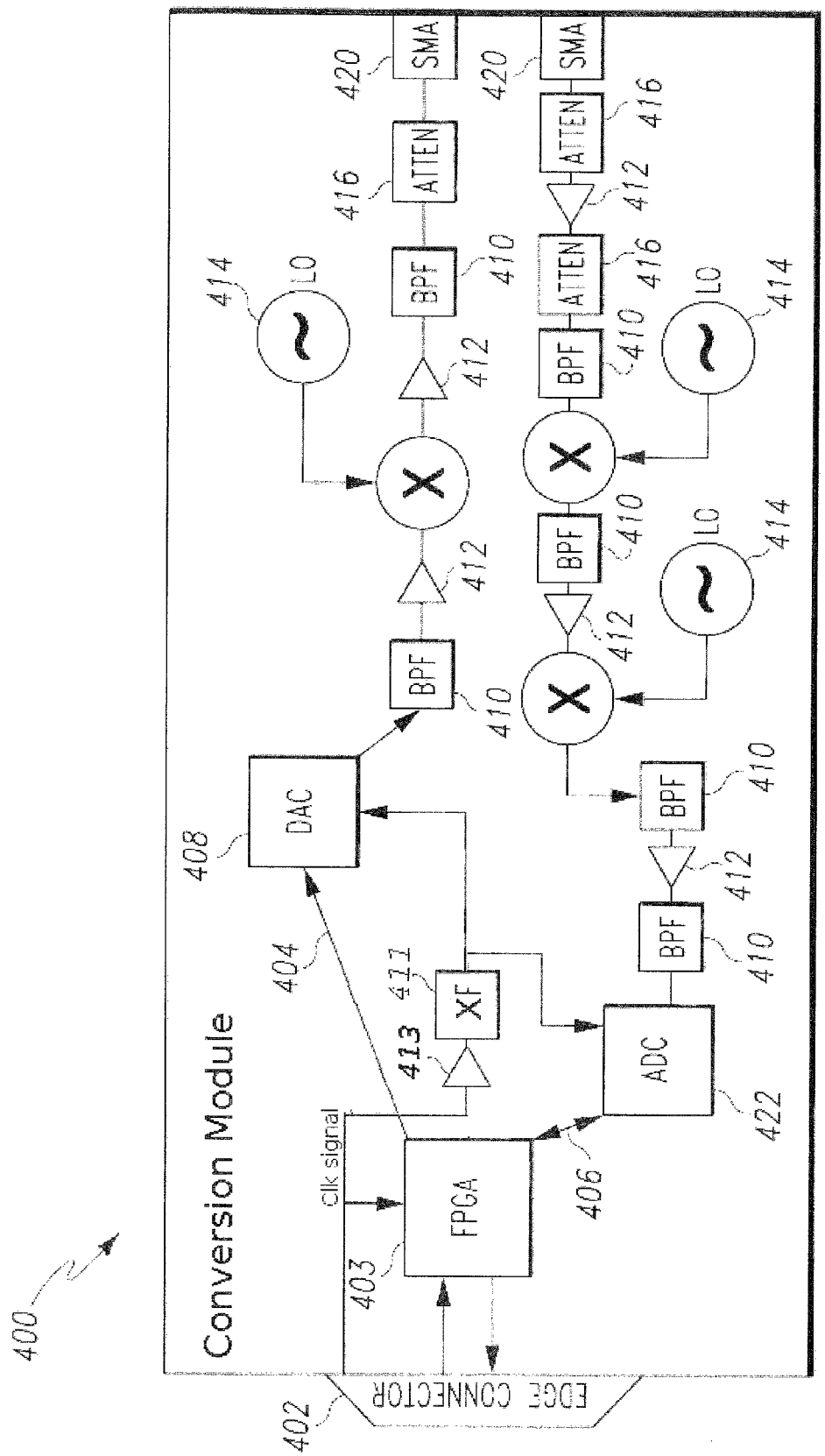
FIG. 4 illustrates a schematic view of one embodiment of a digital to analog radio frequency transceiver module for use in either the host unit of FIG. 2 or the remote unit of FIG. 3.

FIG. 4 shows a schematic view of one embodiment of a conversion module 400 for use in either host unit 102 or remote unit 106. There are multiple embodiments of conversion module 400 as described above, however, some common elements are described hereafter. Conversion module 400 has an edge connector 402 for connection to an interface. Conversion module 400 has two main signal paths; a transmission path 404 and a reception path 406. For signals received from a serial communication module, conversion module 400 forms parallel digital RF data from the incoming digital signal, if needed, at FPGA 403. In this embodiment, FPGA 403 is a logic device that is programmed to convert serial digital data into RF sampled data and programmed to convert RF sampled data into serial digital data. Conversion module 400 then converts the digital signal to analog with digital to analog converter (DAC) 408. Transmission path 404 continues as conversion module 400 filters, amplifies and up-converts the analog signal for RF transmission with an assortment of filters 410, amplifiers 412, an oscillator 414, and an attenuator 416. The transmission path 404 then exits conversion module 400 at a connector 420 communicatively coupled with a base station. Notably, it is to be understood that the configuration of filters 410, amplifiers 412, oscillator 414, and attenuator 416 in transmission path 404 and reception path 406 are provided by way of example and not by way of limitation.

Signals travel in the opposite direction down reception path 406, where they are converted from analog to digital and sent to a serial communication module. First, analog RF signals are received at a connector 420. Conversion module 400 then amplifies, down-converts, and filters the incoming analog RF signal with a plurality of filters 410, amplifiers 412, oscillators 414, and attenuators 416. Conversion module 400 then digitizes the signal with analog to digital converter (ADC) 422. FPGA 403 then forms a digital signal and provides the digital signal, in this embodiment, as parallel digital RF sampled data to a serial communication module.

DAC 408 and ADC 422 are wideband converters. Consequently, a sample clock signal with very low jitter is needed in order for DAC 408 and ADC 422 to operate with the desired performance. In particular, the more jitter in the sample clock signal the more inaccurate the sampling event, which introduces additional noise. For example, in order to achieve 75 db of dynamic range for a wideband signal centered at 70 MHz, a sample clock signal is needed which has a jitter of approximately 400 femto seconds (fs) or less. In order to achieve this low jitter, a clock is needed which has a very high amplitude-to-clock phase noise floor ratio. In this example, a noise floor ratio of approximately −165 dBc/Hz is needed. In addition, the noise floor needs to remain low out to the sample clock encode bandwidth, which in this example is about 300 MHz away from the carrier. Furthermore, with ADCs, the sample clock noise floor folds into the desired sampling bandwidth, and if the noise is sufficiently large, the aliasing of clock noise floor will severely degrade the data converter SNR.

Clocks (also referred to as oscillators) which have low jitter and low wideband noise floor as described above can be prohibitively expensive. One conventional way to provide the sample clock signal is to place a clock in the serial communication module 500 and in each conversion module 400. The clock in the serial communication module provides a master clock. In this conventional technique, each clock in the conversion modules 400 is re-clocked and de-jittered to the master clock so that any noise or spurios signal that was picked up across a backplane or cable is removed. However, the duplication of clocks in each conversion module 400 also introduces added costs.

In embodiments of the present invention, a master clock (e.g. clock 504 in serial communication module 500) provides a sample clock signal to each conversion module 400. In some embodiments, the master clock is a voltage controlled crystal oscillator. The master clock has a noise floor of about −145 dB/Hz at 10 KHz from the carrier frequency. Additionally, the noise floor is substantially flat at the same −145 dBc level, out to 300 MHz from the carrier frequency. Each conversion module coupled to the serial communication module receives the sample clock signal via edge connector 402. FPGA 403 receives the clock signal without spectral modification by conversion module 400. However, the clock signal is passed through a low noise amplifier (LNA) 413 and a monolithic crystal filter 411 prior to being received at DAC 408 and ADC 422.

LNA 413 is a small transistor based amplifier in this embodiment which amplifies the sample clock signal while adding negligible noise to the clock signal. After passing through crystal filter 411, the sample clock signal has a noise floor of about −170 dB/Hz, providing a clock SNR improvement of 25 dB. Crystal filter 411 is a narrow bandpass filter which filters out the wideband noise floor. In particular, in this embodiment, crystal filter 411 has a pass bandwidth of 40 KHz and an ultimate rejection of about −40 dB.

In this way, the same master sample clock signal is used at each conversion module 400. This saves the cost and circuitry required to re-clock separate oscillators in each conversion module 400. Additionally, the cost of a more expensive clock is avoided by achieving the needed noise floor ratio with less expensive off-the-shelf parts. Also, in embodiments of the present invention, a large amplitude sinusoidal clock signal does not have to be generated to provide the necessary noise ratio. For example, in this embodiment a 400 millivolt peak-to-peak differential signal is used. Therefore, problems associated with radiation of a large amplitude clock signal affecting other circuitry are avoided. Similarly, if ADC 422 or DAC 408 pick up another digital clock signal (e.g. a PCI clock signal) from other components, such as the backplane, the other spurious signals are filtered by the crystal filter 411. Finally, using crystal filter 411 in each conversion module 400 greatly reduces the effects of the noise floor folding into sampled bandwidth whereas other typical techniques, such as re-clocking separate oscillators, do not.

Figure 5:
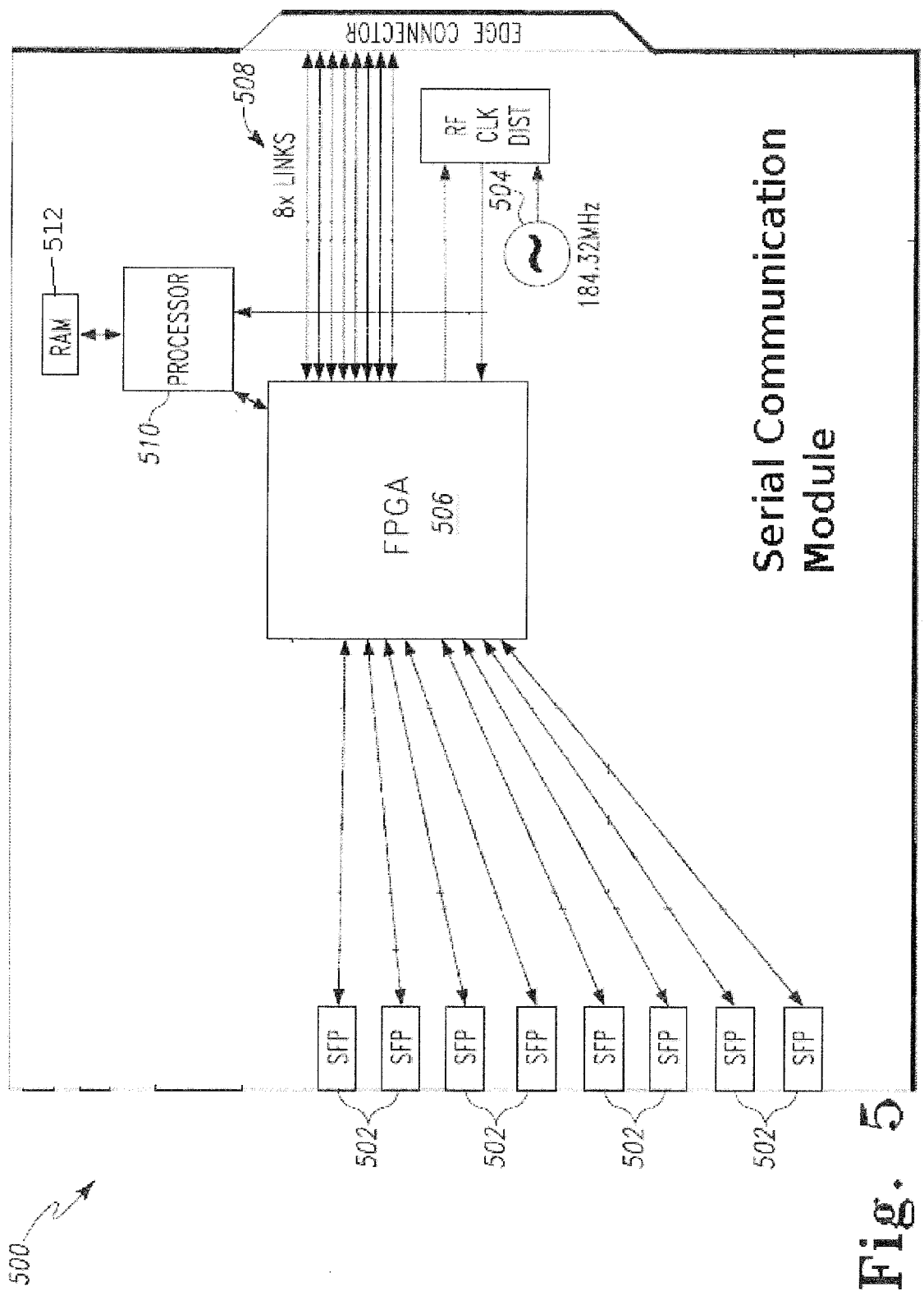
FIG. 5 illustrates a schematic view of one embodiment of a serial communication module for use in either the host unit of FIG. 2 or the remote unit of FIG. 3.

FIG. 5 illustrates a schematic view of one embodiment of a serial communication module 500 for use in either host unit 102 or remote unit 106. Serial communication module 500 has a plurality of optical input/outputs 502, a clock 504, a field programmable gate array (FPGA) 506, a plurality of links 508, and a processor 510. Clock 504 provides a master sample clock signal to each conversion module 400 via the plurality of links 508. In particular, in this embodiment, clock 504 is a voltage controlled crystal oscillator as described above.

In this embodiment, serial communication module 500 has eight (8) optical input/outputs 502. Optical input/outputs 502 connect to optical fiber which is used as a transport mechanism, or optical fiber that links serial communication module 500 to an optical multiplexer or a millimeter waver or microwave transceiver. Optical input/outputs 502 receive/transmit high speed optical serial data transmission from/to another serial communication module. Serial communication module 500 has eight (8) optical input/outputs 502 and 8 links 508 for 8 separate conversion modules which transmit RF sampled data to/from conversion modules.

In one direction, serial communication module 500 receives incoming digital signals over links 508 from conversion modules, assembles data frames, and sends an outgoing optical serial data stream through optical input/outputs 502. In the other direction, serial communication module 500 receives an optical serial data stream from another serial communication module at optical input/outputs 502. Serial communication module 500 then disassembles the frames of the serial data stream, and provides digital signals over links 508 to conversion modules. Serial communication module 500 also performs splitting and summing for digital simulcast, and provides a user interface for alarm, status, or configuration management.

Figure 6:
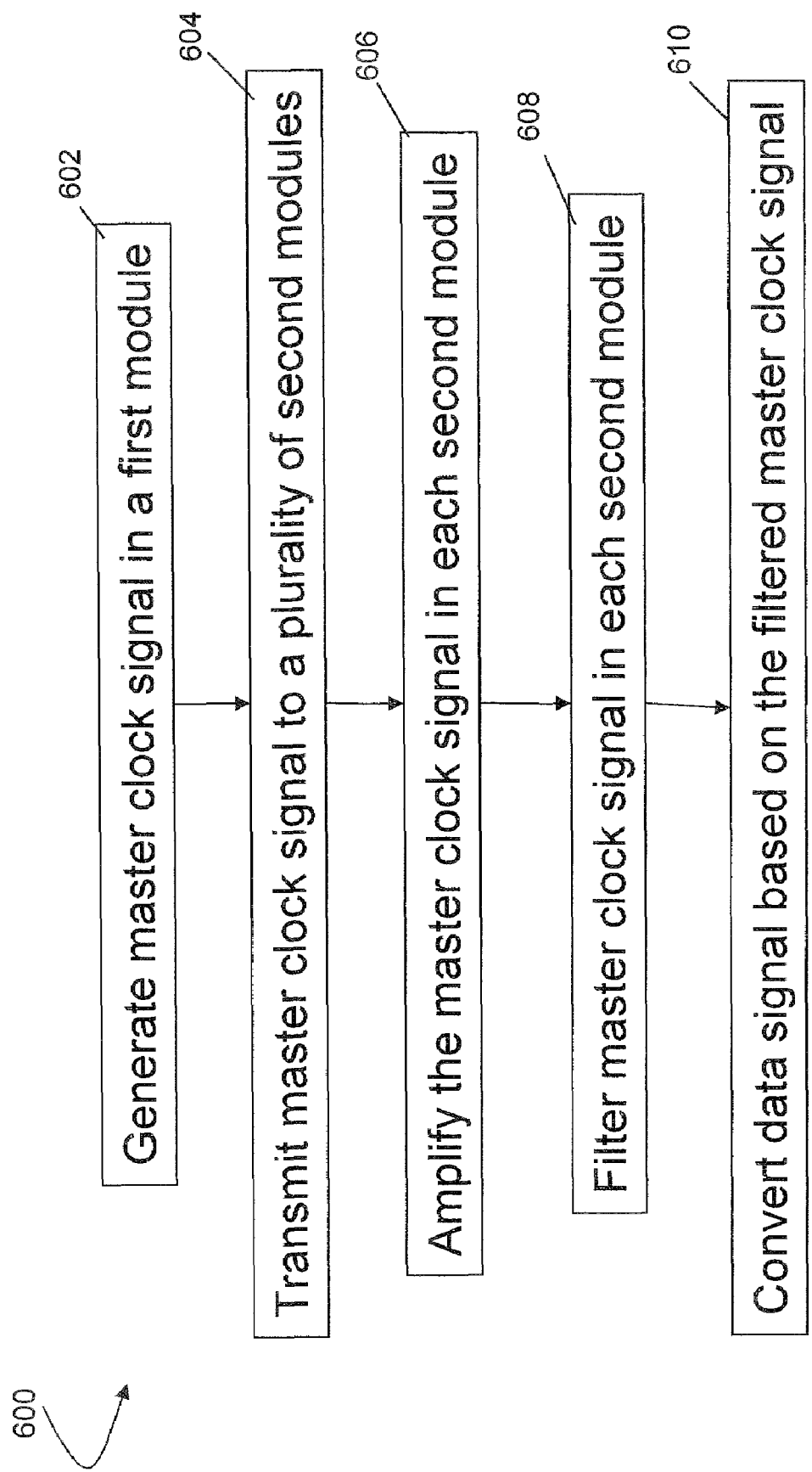
FIG. 6 is a flow chart depicting a method of using a clock signal in a communication system.

FIG. 6 is a flow chart depicting a method of using a clock signal in a communication system according to one embodiment of the present invention. At 602, a master clock signal is generated in a first module (e.g. module 500 in FIG. 5). In one embodiment, a voltage controlled crystal oscillator is used to generate the master clock signal. At 604, the master clock signal is transmitted to each of a plurality of second modules (e.g. module 400 in FIG. 4). In one embodiment, the master clock signal is transmitted via a backplane coupled to each of the second modules and the first module. In another embodiment, the master clock signal is transmitted via a plurality of cables, each cable coupled to the first module and one of the second modules. In addition, in this embodiment, the master clock signal is transmitted unfiltered. In other embodiments, the master clock signal is filtered and then transmitted to each of the second modules.

At 606, the master clock signal is amplified with a low noise amplifier in each of the second modules. At 608, the amplified master clock signal is filtered in each of the second modules. For example, in one embodiment a monolithic crystal filter is used to filter the master clock signal. By filtering the wideband noise floor of the master clock signal filter, the dynamic range of the master clock signal is increased. At 610, the filtered master clock signal is used by a converter to convert data signals. For example, in some embodiments, the filtered master clock signal is used to convert between digital and analog signals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

I claim:

1. A communication system comprising:
   a host unit comprising:
      a first module having a first oscillator configured to generate a first master clock signal having an amplitude-to-noise floor ratio that is insufficient to achieve a desired jitter level; and
      a plurality of second modules coupled to the first module to receive the first master clock signal, each of the plurality of second modules having a first filter to filter the first master clock signal such that the amplitude-to-noise floor ratio is increased sufficiently to achieve the desired jitter level, and a first converter configured to use the filtered first master clock signal rather than a clock signal generated in the respective second module in converting between analog and digital signals;
   a transport mechanism; and
   at least one remote unit distributed in a coverage area, the at least one remote unit communicatively coupled to the host unit via the transport mechanism, wherein the at least one remote unit comprises:
      a third module having a second oscillator configured to generate a second master clock signal having an amplitude-to-noise floor ratio that is insufficient to achieve the desired jitter level; and
      a plurality of fourth modules coupled to the third module to receive the second master clock signal, each of the plurality of fourth modules having a second filter to filter the second master clock signal such that the amplitude-to-noise floor ratio is increased sufficiently to achieve the desired jitter level, and a second converter configured to use the filtered second master clock signal rather than a clock signal generated in the respective fourth module in converting between analog and digital signals.

2. The communication system of claim 1, wherein the transport mechanism comprises one of a fiber optic cable, a wireless millimeter wave signal transceiver, and a microwave radio transceiver.

3. The communication system of claim 1, wherein the first and third modules are configured to convert between serial data streams and digital radio frequency (RF) signals.

4. The communication system of claim 3, further comprising an optical multiplex module coupled to the first module and configured to multiplex optical serial data streams transported to the first module.

5. The communication system of claim 1, further comprising a base station coupled to at least one of the plurality of second modules, wherein the at least one second module converts analog radio frequency (RF) signals received from the base station to digital RF signals using the filtered first master clock signal.

6. The communication system of claim 1, further comprising a remote antenna coupled to at least one of the plurality of fourth modules, wherein the at least one fourth module converts analog RF signals received from the antenna to digital RF signals using the filtered second master clock signal.

7. The communication system of claim 1, wherein the host unit further comprises a backplane coupled between the first module and the plurality of second modules, the backplane configured to distribute the first master clock signal to each of the plurality of second modules.

8. The communication system of claim 1, wherein the remote unit further comprises a plurality of cables, each of the plurality of cables coupled between the third module and one of the plurality of fourth modules, each of the plurality of cables configured to carry the second master clock signal to one of the plurality of fourth modules.

9. The communication system of claim 1, wherein the first converter in each of the plurality of second modules and the second converter in each of the plurality of fourth modules is at least one of a wideband analog-to-digital converter and a wideband digital-to-analog converter.

10. The communication system of claim 1, wherein each of the first oscillator and the second oscillator is a voltage controlled crystal oscillator.

11. The communication system of claim 1, wherein the first filter in each of the plurality of second modules and the second filter in each of the plurality of fourth modules is a monolithic crystal filter.

12. The communication system of claim 1, wherein each of the plurality of second modules and each of the plurality of fourth modules further comprise an amplifier configured to amplify the first master clock signal and the second master clock signal, respectively, and pass the respective amplified master clock signal to the first filter and the second filter, respectively.

13. A unit for use in a communication system, the unit comprising:
   a communication module having an oscillator configured to generate a master clock signal having an amplitude-to-noise floor ratio that is insufficient to achieve a desired jitter level;
   a plurality of conversion modules; and
   a distribution component configured to distribute the master clock signal from the communication module to each of the plurality of conversion modules;
   wherein each of the plurality of conversion modules comprises:
      a filter configured to filter the master clock signal such that the amplitude to-noise floor ratio is increased sufficiently to achieve the desired jitter level; and a converter configured to use the filtered master clock signal rather than a clock signal generated in the respective conversion module in converting between analog and digital signals.

14. The unit of claim 13, wherein the communication module is configured to transmit and receive serial data streams.

15. The unit of claim 13, wherein the distribution component comprises one of:
   a backplane coupled between the communication module and the plurality of conversion modules, the backplane configured to distribute the master clock signal to each of the plurality of conversion modules; and
   a plurality of cables, each of the plurality of cables coupled between the communication module and one of the plurality of conversion modules, each of the plurality of cables configured to carry the master clock signal to one of the plurality of conversion modules.

16. The unit of claim 13, wherein the oscillator is a voltage controlled crystal oscillator.

17. The unit of claim 13, wherein the filter in each of the plurality of conversion modules comprises a monolithic crystal filter.

18. The unit of claim 13, wherein each of the plurality of conversion modules further comprise an amplifier configured to amplify the master clock signal and pass the amplified master clock signal to the filter.

19. A unit for use in a communication system, the unit comprising:
- means for generating a master clock signal in a first module, the master clock signal having an amplitude-to-noise floor ratio that is insufficient to achieve a desired jitter level;
- means for distributing the master clock signal to a plurality of second modules;
- means for filtering the master clock signal in each of the plurality of second modules such that the amplitude to-noise floor ratio is increased sufficiently to achieve the desired jitter level; and
- means for converting between digital and analog signals using the filtered master clock signal in each of the plurality of second modules rather than a clock signal generated in each of the respective second modules.

20. The unit of claim 19, further comprising means for amplifying the master clock signal in each of the plurality of second modules, wherein the filtering means filters the amplified master clock signal.

21. A conversion module comprising:
- a connector configured to receive a master clock signal having an amplitude-to-noise floor ratio that is insufficient to achieve a desired jitter level;
- a filter configured to filter the received master clock signal such that the amplitude to-noise floor ratio is increased sufficiently to achieve the desired jitter level; and
- a converter configured to use the filtered master clock signal in converting between analog and digital signals rather than a clock signal generated in the conversion module.

22. The conversion module of claim 21, wherein the filter comprises a monolithic crystal filter.

23. The conversion module of claim 21, further comprising a field programmable gate array (FPGA) which receives the unfiltered master clock signal from the connector.

24. The conversion module of claim 21, further comprising an amplifier configured to amplify the master clock signal and pass the amplified master clock signal to the filter.

25. The conversion module of claim 24, wherein the amplifier comprises a low noise amplifier.

26. A method of using a master clock signal in a communication unit, the method comprising:
- generating the master clock signal in a first module, the master clock signal having an amplitude-to-noise floor ratio that is insufficient to achieve a desired jitter level;
- transmitting the master clock signal to each of a plurality of second modules;
- filtering the master clock signal in each of the plurality of second modules such that the amplitude to-noise floor ratio is increased sufficiently to achieve the desired jitter level; and
- converting between analog and digital signals based on the filtered master clock signal rather than on a clock signal generated in each of the respective second modules.

27. The method of claim 26, wherein transmitting the master clock signal to each of the plurality of second modules comprises transmitting the master clock signal via one of a backplane coupled to each of the plurality of second modules.

28. The method of claim 26, wherein transmitting the master clock signal to each of the plurality of second modules comprises transmitting the master clock signal via a plurality of cables each cable coupled to one of the plurality of second modules.

29. The method of claim 26, further comprising amplifying the master clock signal prior to filtering the master clock signal.

30. The method of claim 26, wherein transmitting the master clock signal comprises transmitting the master clock signal unfiltered to each of the plurality of second modules.

* * * * *